March 4, 1969   O. HENDRICKSON   3,430,510
ANGLE HEAD EXTENSION FOR WRENCHES
Filed Aug. 15, 1967   Sheet 1 of 2
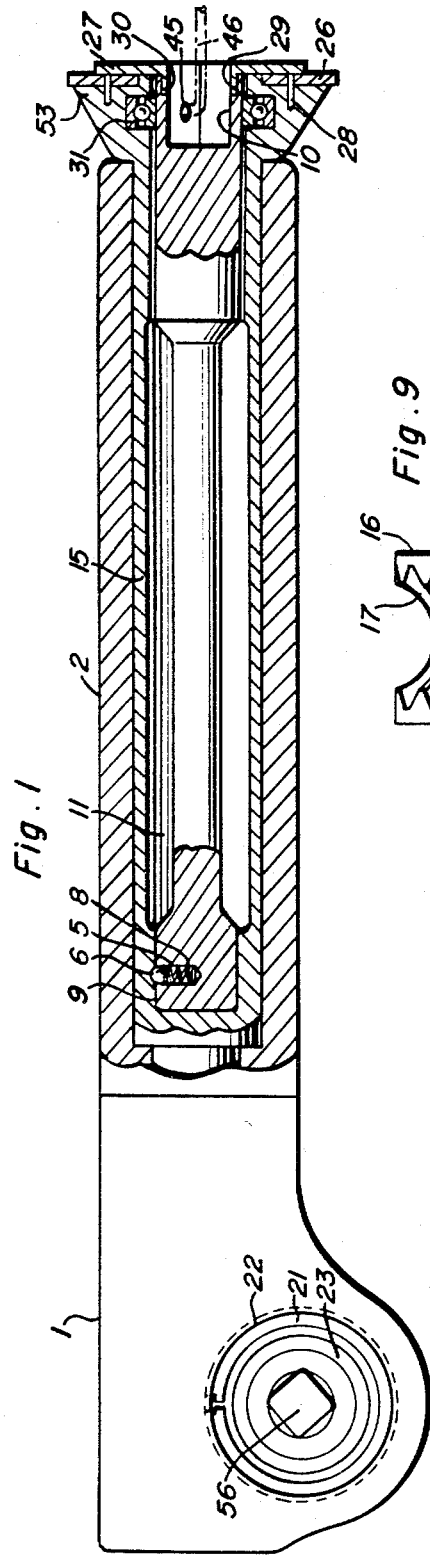
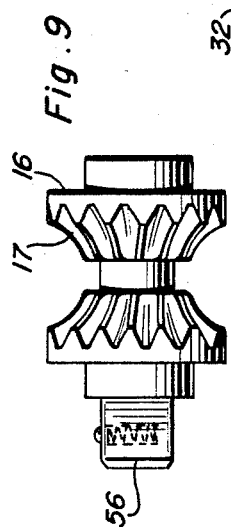
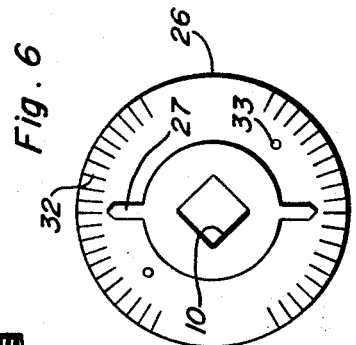
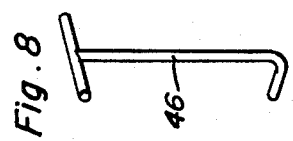
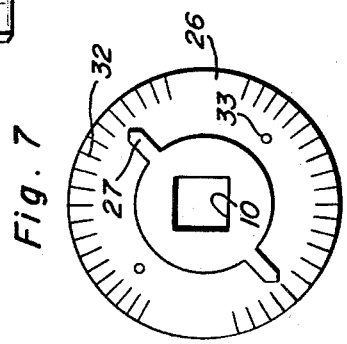
Otto Hendrickson
INVENTOR.
BY *Clarence A. O'Brien*
and *Harvey B. Jacobson*
Attorneys March 4, 1969 O. HENDRICKSON 3,430,510
ANGLE HEAD EXTENSION FOR WRENCHES
Filed Aug. 15, 1967
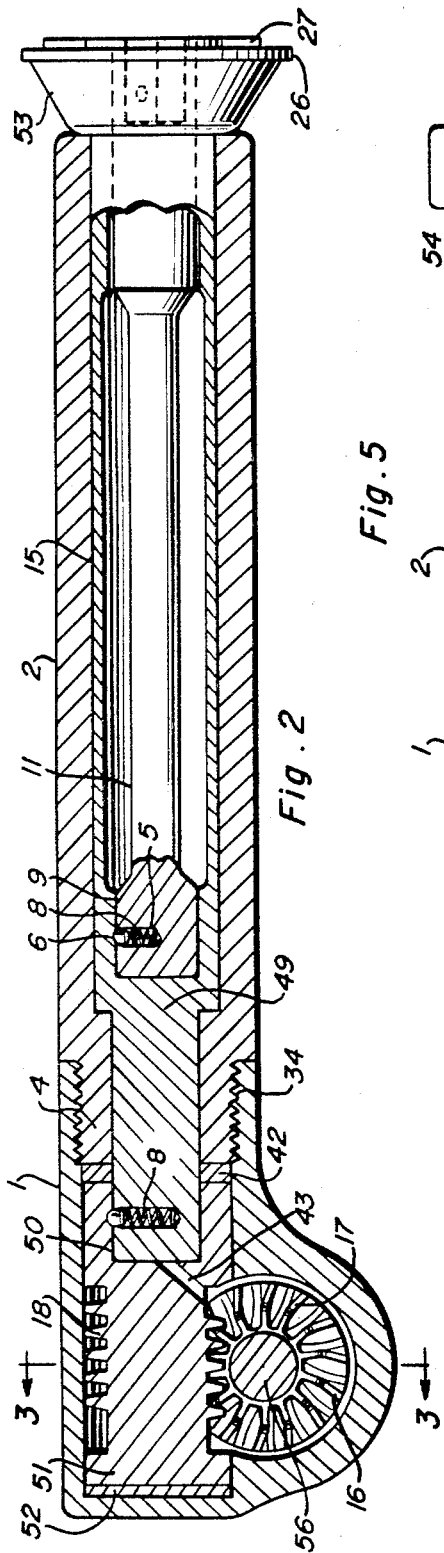
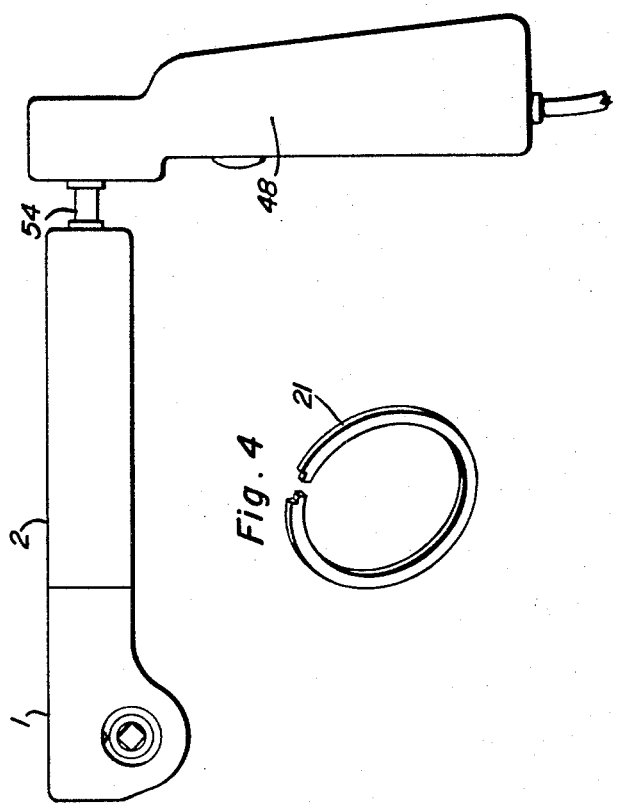
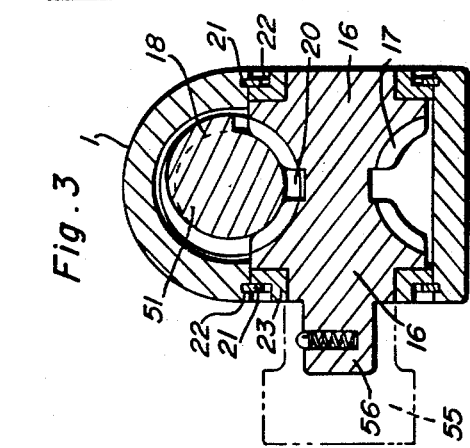
Otto Hendrickson
INVENTOR.

United States Patent Office 3,430,510
Patented Mar. 4, 1969

3,430,510
ANGLE HEAD EXTENSION FOR WRENCHES
Otto Hendrickson, P.O. Box 5316, Canyon Crest Station,
Riverside, Calif. 92507
Filed Aug. 15, 1967, Ser. No. 660,782
U.S. Cl. 74—425                                    10 Claims
Int. Cl. F16h 1/20

ABSTRACT OF THE DISCLOSURE

Two helical gears are integral with a shaft, one end of which terminates in a square portion for the receipt of socket attachments. The gears are maintained in axial spatial relation to each other and angularly related to align each tooth on each of the gears with a corresponding tooth on the other gear along the same helical path. The helical gears are driven by a worm-screw gear with an axis oriented perpendicular to the axis of the aforementioned shaft and held in meshing engagement with the helical gears. One end of the worm screw gear abuts an end of a hollow housing along a thrust bearing surface while the other end of the worm screw is terminated along the interior length of the housing against an interiorly located bearing abutment. This end of the worm screw contains a square or polygonal cavity into which mates a squared or polygonal shaft portion of a rigid shaft coaxially positioned within the hollow housing which forms a handle for manipulation of the extension. Alternatively, a flexible or twistable shaft may be employed in lieu of the rigid shaft. Further, a concentric hollow shaft and flexible shaft may be employed in the housing with hollow shaft drivingly engaging the worm screw and the flexible shaft drivingly engaging the hollow shaft adjacent the worm screw thereby enabling the torque exerted by the extension to be measured by the use of a dial and pointer gauge associated with the ends of the hollow shaft and flexible shaft remote from the worm screw by measuring the amount of twist displacement of the flexible shaft with respect to the hollow shaft to which it is connected. Thus, the angle attachment permits fastening of a bolt orientated perpendicular to the housing length and further allows the user to measure the torque applied to a fastener. Each type of shaft or shaft assembly has a socket in the outer end thereof for driving engagement with a wrench or another extension.

---

The present invention generally relates to multipurpose angle attachments for hand and power driven tools. In the assembling of machines, aircraft, automobiles and other mechanical structures, it is often difficult or impossible to apply a straight socket tool to a remotely situated fastener. In such situations, it is a necessary expedient to incorporate the use of an angle attachment thereby permitting a socket to be inserted upon the fastener and tightened by a driving member situated perpendicularly to the axis of the fastener. Such application is widespread in the machine industry where fasteners are incorporated on interiorly situated surfaces and in spaces where direct accessibility is not possible.

The desirability of right angle drive has long been recognized and disclosed in the prior art and is illustrated by Patent No. 1,346,761 issued July 13, 1920, 1,698,618 issued Jan. 8, 1929 and 2,764,048 issued Sept. 25, 1956. As is evidenced from an inspection of the prior art devices, long wear particularly for heavy loads is unobtainable and in addition, attachments of the type available in the prior art requires relatively large dimensions thereby making it more difficult to maneuver the tool in tight places. These disadvantages are inherent for the reasons now to be discussed: The prior art devices fail to provide ample bearing surface area for the worm screw gear teeth which would enable these teeth to closely mesh with teeth of the worm wheel, a necessity for maximum torque transmission. In addition, prior designs fail to provide a self-contained interior path for lubrication transmitted to rotating parts during high speed operation. Another disadvantage of prior art tools is a failure of same to provide an inexpensive and reliable torque measurement device for measuring the "tightness" of a fastener with its seat. A notable disadvantage of previous devices relates to their capacity for absorbing shock from the driver and impact from seated fasteners which becomes manifest when a fastener contacts a mating surface at high speed.

The present invention is directed to a head extension for power wrenches or hand driven tools which permits the user to tighten a fastener having an axis perpendicular to the axis of the driving shaft. Power transmission is facilitated by a solid shaft, by a flexible drive shaft, or by a flexible shaft concentric with and in interlocking engagement with a hollow solid drive shaft which in turn engages a worm screw gear the tooth top surface of which is parallel to the drive shaft housing. Bearing surface engagement is developed by the top of said worm screw gear teeth and the interior surface of the shaft housing. This bearing relationship between housing and worm screw gear establishes rigidity between the two members and in effect permits a tight engagement between the worm screw gear and worm wheel. The characteristic close engagement between these gears permits a significantly greater degree of torque transmission by the drive shaft with respect to prior art devices in which the worm screw gear is not provided with a bearing surface characteristic of the present invention. In addition, the present invention utilizes two helical gears axially displaced upon and fixed to a shaft with corresponding teeth on each gear lying along the same helical path. This gear arrangement simulates a worm wheel requiring a smaller thickness dimension than other gear drives, thereby resulting in compactness of size for the angle head extension. This compactness provides the advantageous result of increased maneuverability of the tool in tight places thereby allowing an attached socket to tighten a fastener located in a place inaccessible to most conventional angle head extensions. One of the drive shafts of the instant invention is fabricated from a flexible, twistable material. The advantage of utilizing such a shaft becomes apparent at the point when fastener and surface mate, a point where shock is produced. The flexible shaft absorbs such shock and twists to "give" slightly thereby preventing the head of a fastener to shear. An additional advantage of the instant invention is realized when one considers prior angle head extensions which have not provided for an inexpensive and reliable means for measuring the torque applied to a fastener after seating has occurred, the present invention fills this need by utilizing a simple dial plate and pointer affixed to the end of the head extension and operated in a manner to be explained.

Accordingly, an object of the present invention is to provide an angle head extension for power wrenches and hand tools including an improved and novel means for transmitting rotation from a shaft member to a socket. The transmission means specifically including a worm screw gear the teeth of which are characterized by a flat top surface made to engage the interior portion of the tool housing in a manner providing a bearing surface between the two.

Another object of the present invention is to provide a worm gear composed of two helical gears fixed to a common shaft the teeth of both gears aligned to simulate a worm wheel.

A still further object of the invention is to provide ample lubrication for worm gears operating at high speed.

Another object of the invention is to provide an inexpensive and reliable torque measuring device for measuring torque applied to a fastener at the point when fastener and seat have been firmly engaged.

A further object of the present invention is to provide a drive shaft which absorbs shock when fastener and mating surface contact.

A still further object of the invention is to provide a worm wheel and worm screw arrangement capable of long wear for heavy loads.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view showing the torque measuring drive shaft assembly in section.

FIGURE 2 is a side sectional view of the angle head extension.

FIGURE 3 is a vertical sectional view, taken substantially upon a plane passing along section line 3—3 of FIGURE 2 illustrating the specific structural details of the worm gear and worm screw engagement.

FIGURE 4 is a perspective view of the retaining clip utilized in retaining the gear assembly within the tool housing.

FIGURE 5 is a side elevational view of the angle head extension attached to a power driver.

FIGURE 6 is a side elevational view of the detachable torque dial and pointer indicator with the pointer in the zero torque position.

FIGURE 7 is a side elevational view of the detachable dial and pointer torque indicator with the pointer showing a displacement from the zero torque position.

FIGURE 8 is a view in perspective of a hook tool used to withdraw the interiorly disposed drive shafts.

FIGURE 9 is a side elevational view of the worm gear.

Referring now more specifically to the drawings, the numeral 2 generally designates the drive shaft housing characterized by a hollow tubular center and solid metal cylindrical walls. The housing 2 includes a threaded end portion 34 which threads into the gear housing 1 and connects the two rigidly. Within the hollow portion of drive shaft housing 2 is concentrically disposed a hollow drive shaft 15 terminating in a square end portion 49 which passes through the end portion 4 of drive shaft housing 2 and further extends into square recess 50 of worm screw gear 51. To connect shaft 15 to worm screw gear 51, square end portion 49 contains a radial recess 5 within which is placed spring 8 and capped with the ball 6 which engages a mating recess in worm screw gear 51. Each tooth 18 of worm screw 51 has a cylindrically contoured top for bearing against the mating surface of the interior cylindrical wall of gear housing 1 and each end of gear 51 is also journaled in housing 1.

Referring to FIGURE 3, the aforementioned bearing relation exists about the upward half circumferential surface of worm screw gear 51. The downward half portion engages the helical gears 16 by meshing with the helical gear teeth 17. The axis of rotation defined by helical gears 16 is oriented perpendicular to the axis of rotation of the drive shaft thereby allowing right angular fastening by means of the socket 55, for example, shown in phantom. Helical gears 16 are fixed to shaft 56 or the composite is cut from one piece of stock. The helical gears 16 are in axial spatial relation to each other and these gears are angularly related to each other to align each tooth on one of the gears with a corresponding tooth on the other along the same helical path. Worm screw gear 51 is axially oriented perpendicularlly to the axis of the shaft 56 and held in meshing engagement with the helical gears 16. The flank surfaces of corresponding teeth of the respective helical gears 16 form a curvature having an axis of rotation collinear with the axis of the worm screw gear 51.

Referring to FIGURE 2, axial motion of the worm screw gear 51 is prevented by the inclusion of thrust bearing 52 which contacts the gear housing 1 on one surface of the bearing and one end of the worm screw gear 51 on the opposite surface thereof. The opposite end of the worm screw gear 51 abuts thrust bearing 42 which in turn abuts end wall portion 4 of the housing 2.

Hollow drive shaft 15 contains a hollow interior in which is disposed flexible, twistable shaft 11, one end forming the square portion 9 with the radial recess 5 included therein. Spring 8 is inserted in recess 5 and capped with ball 6 which engages a mating spherical recess in shaft 15. The external end of shaft 11 contains the square cavity 10 one wall of which contains a hole or recess which may be engaged by tool 46 specifically illustrated in FIGURE 8. By inserting the hook end of tool 46 in hole 45 and exerting a pulling force thereon, the flexible shaft 11 may be removed for interchange with other shaft assemblies and cleaning and oiling. A similar hole is provided in shaft 15 to remove it by using tool 46.

The lubrication of the worm screw and wheel assembly is accomplished when the drive shaft assembly is removed thereby allowing access to the worm gears. Referring specifically to FIGURE 2, oil passageway 43 leads from the square recess 50 to the helical gear teeth 17 so that by depositing lubrication down the drive shaft housing 2 when the drive shafts 15 and 11 are removed and subsequently repositioning the drive shafts back into the housing, pressure is developed within the drive shaft housing 2 which forces lubrication through the oil passageway 43 and onto the helical gear teeth 17 with the eventual lubrication of engaging worm screw gear teeth 18.

Referring to FIGURE 3, the gears are sealed within the gear housing by side plates 23. A retainer 21, as illustrated in FIGURE 4, is positioned about the exterior surfaces of side plate 23 and upon release of retainer 21, the retainer springs apart into grooves 22 located within the gear housing 1.

As illustrated in FIGURE 1, drive shaft 15 is extended outwardly to define a truncated conical portion 53 on the base of which is fastened the circular dial plate 26 by means of retaining pins 28 inserted into retaining holes 33. Overlying the dial plate is a pointer member 27 which contains prongs 29 inserted into receiving slots 30 within the body of shaft 11. Ball bearing 31 is positioned between conical member 53 and shaft 15 thereby facilitating relative rotation between shaft 11 and shaft 15. The purpose for providing this rotational facility is explained hereinafter.

As illustrated in FIGURE 5, the angle head extension is attached to prime mover output shaft 54 which in turn is driven by power source 48 which may typically be of the electrical or pneumatic variety or a hand powered tool.

In operation, this prime mover shaft is inserted into the square cavity 10 of drive shaft 11 and upon actuation of the power source 48, drive shaft 11 rotates shaft 15 which in turn transmits rotational motion to worm screw gear 51 which in turn translates motion perpendicularly to helical gears 16 mounted upon shaft 56, the latter terminating in an end portion upon which socket 55 shown in phantom is mountable. When a fastener has become firmly seated, flexible shaft 11 twists in a manner preventing excessive twisting forces which may shear the head of the fastener.

In an application that requires the determination of torque applied to a fastener after it has been seated, the angle head extension is retained over the fastener and rotational force is applied to the extension in which case drive shaft 15 will remain stationary and shaft 11 will twist. The end of this shaft contains the pointer 27 which overlies the stationary dial plate 26.

FIGURE 6 illustrates the initial zero torque position while FIGURE 7 illustrates the pointer displacement marking 32 calibrated in torque measurements, the displacement results upon application of rotational force to shaft 11 after the fastener has been seated.

In an alternate utilization of the present invention, the driving shaft 15 may be solidly constructed throughout its body thereby obviating the use of a second driving shaft interconnected with the first as disclosed herein before. Such a construction would be advantageous for low speed hand power operation.

In addition to using a solid shaft which would conform generally in configuration to the hollow shaft 15, a flexible shaft similar to shaft 11 may be employed which, of course, would be longer than the shaft 11 and would have the inner end thereof engaged within the socket 50 in the worm screw gear 51 and the outer end of course provided with a socket. The outer end of the flexible shaft would be slightly larger in diameter than the flexible shaft 11 illustrated in FIGURES 1 and 2 and would have bearing engagement with the inner end of the housing 2.

Thus, in each embodiment of the invention, the housing 2 is stationary and forms a handle for manipulation of the extension.

The rigid solid drive shaft (not shown) will deliver full torque to the output end of the extension due to the rigid shaft transmitting the power. This arrangement is employed primarily where large nuts or bolts are removed or placed. The single flexible or twistable drive shaft (similar to drive shaft 11) is employed in production applications where no desired torque on fasteners is required such as where it is only required that all of the fasteners be drawn down to securely hold the parts together. This type of shaft absorbs the impact shock in the shaft so that when an impact shock is delivered to the worm screw through the twistable shaft, it will turn the worm screw in a cushioned manner and the output shaft cannot back up due to the teeth in the ring gear disposed against the teeth on the worm screw gear. Inasmuch as the output of the extension cannot turn in either direction, the extension can be employed as a manual wrench for initially loosening or finally tightening a bolt or fastener. For example, an operator can check the tightness of a bolt or nut if there is room to move the handle slightly toward the tight side by moving the handle 2 in the same manner as a conventional wrench handle. If torque measurement is desired, the assembly illustrated in FIGURES 1 and 2 is employed in which the end portion 49 of the shaft 15 is rigid and rotates in the forward end portion 4 of the housing 2 so that, in effect, the flexible shaft 11 has the inner end thereof rigidly connected with the rigid end portion 49 and the worm screw 51. Thus the torsion transmitted to the flexible drive shaft 11 will cause twisting thereof and the degree of twisting will be indicated by the graduated scale on the dial which is fixed in relation to the shaft 15 which turns as the fastener is tightened with the degree of twisting of the drive shaft 11 being indicated by the pointer on the dial.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An angle head extension enclosed within an elongated drive shaft housing connected together with an adjoining gear housing comprising shaft means for mounting a tool head, means for rotating said shaft means including a pair of helical gears fixed to said shaft means in axial spatial relation to each other, said gears being angularly related to each other to align each tooth on one of said gears with a corresponding tooth on the other of said gears along the same helical path, a worm screw gear axially disposed perpendicularly to the axis of said shaft means and held in meshing engagement with said helical gears wherein the flank surfaces of corresponding teeth of the respective helical gears form a curvature having an axis of rotation collinear with the axis of said worm screw gear, and means for rotatably driving said worm gear screw.

2. An extension device as defined in claim 1 wherein the tooth profile of said worm screw gear is characterized by a radially outermost surface of cylindrical contour the radius being equal to the inner radius of said gear housing.

3. An extension device as claimed in claim 2 wherein said means for rotatably driving said worm gear screw includes a square recess contained within the driven end portion of said worm gear screw, a first drive shaft, one end squarely formed for interlocking engagement with said recess, the opposite end thereof coplanar with the free end of said drive shaft housing, said first drive shaft being further characterized by a center hollow portion, a second flexible, twistable drive shaft disposed within said hollow portion, one end of said second shaft squarely formed for interlocking engagement with the interior body of said first drive shaft, the opposite end of said second drive shaft coplanar with the free end of said drive shaft housing.

4. The angle head extension as recited in claim 3 wherein said worm gear screw contains an interiorly situated passage the ends of which connect said aforementioned square recess therein and a point on the inner diametrical surface of said worm gear screw in a manner effecting lubrication transmittal between the interior of said drive shaft housing and said gears.

5. The device of claim 4 wherein said first drive shaft contains a recess containing a lock ball and spring, said ball engaging a spherical cavity within the adjoining body portion of said worm gear screw and further wherein said second drive shaft contains a similar lock ball and spring for engagement with said first drive shaft, the free end of said second drive shaft containing a prismatic recess, one wall of said recess containing a recess therein for engagement with a spring ball detent on an output shaft of a wrench, and a hook tool, a pulling force exerted on said tool resulting in a sliding outward displacement of said first and second drive shafts.

6. A device as claimed in claim 5 wherein each of said helical gears outwardly terminate in planar surfaces, said device further including side plates for engaging said planar surfaces, said side plates containing a central aperture through which said shaft means extends, said side plates held in position by retaining rings containing a slitted circumference, each of said rings positioned around the outer surface of each of said side plates and inserted within a circular recess contained within the body of said gear housing thereby securing said gears and said side plates within said housing.

7. A torque transmitting drive shaft assembly contained within a housing including, a first shaft interiorly hollow, a second twistable shaft disposed within said hollow and coaxial therewith, a first corresponding end of said drive shafts mutually interconnected, the second end of said first drive shaft terminating in a planar base disposed externally of said housing, a dial plate affixed to said planar base, a pointer assembly overlying said dial plate and held in interlocking engagement with the second end of said second drive shaft for measuring the angular displacement of said second twistable drive shaft with respect to said first drive shaft.

8. An assembly as recited in claim 7 wherein said second shaft contains a prismatic recess at the free end thereof, said recess containing a plurality of slotted walls and further wherein the underside of said dial plate includes retaining clips for insertion into said slotted walls, said dial plate additionally including a cut out portion identical with the outer dimensional profile of said recess and overlying same to receive a prismatic prime mover shaft.

9. The assembly as set forth in claim 8 wherein said first and second shafts include complementary circular slotted interior portions, said assembly further including a ball bearing assembly for insertion into said aforementioned complementary plotted interior portions.

10. The structure as defined in claim 1 wherein said means driving said worm gear screw includes a first drive shaft interiorly hollow and interlockingly engaged and coaxial with said worm screw gear at a first end thereof, a second flexible and twistable drive shaft interlockingly engaged and interiorly coaxial with said first drive shaft at said first end thereof, a dial plate affixed to the second end of said first drive shaft, a pointer assembly interlockingly engaged with the free end of said second drive shaft for measuring the angular displacement of said second drive shaft relative to the first.

References Cited

UNITED STATES PATENTS

| | | | |
|---|---|---|---|
| 2,290,579 | 7/1942 | Bruno | 74—424.5 |
| 2,808,749 | 10/1957 | Lampke. | |
| 3,016,775 | 1/1962 | Calkins. | |

DONLEY J. STOCKING, *Primary Examiner.*

LEONARD H. GERIN, *Assistant Examiner.*

U.S. Cl. X.R.

81—57